United States Patent
Matsubara et al.

(10) Patent No.: US 7,537,746 B2
(45) Date of Patent: *May 26, 2009

(54) PROCESS AND APPARATUS FOR PRODUCING INORGANIC SPHERES

(75) Inventors: Toshiya Matsubara, Chiba (JP); Masaharu Tanaka, Fukuoka (JP); Kenji Yamada, Kanagawa (JP); Hajime Katayama, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 831 days.

This patent is subject to a terminal disclaimer.

(21) Appl. No.: 10/864,593

(22) Filed: Jun. 10, 2004

(65) Prior Publication Data

US 2004/0251569 A1    Dec. 16, 2004

(30) Foreign Application Priority Data

Jun. 11, 2003    (JP)    ............ 2003-166601

(51) Int. Cl.
  *C01B 33/12*    (2006.01)
  *B01J 35/08*    (2006.01)
  *B29B 9/00*    (2006.01)
  *B22D 11/01*    (2006.01)
  *B22F 9/00*    (2006.01)
  *B28B 17/00*    (2006.01)
  *B29C 67/02*    (2006.01)

(52) U.S. Cl. .............. 423/338; 502/8; 264/5; 264/8; 425/6

(58) Field of Classification Search ........ 423/338; 265/5; 502/8; 264/13; 425/6
See application file for complete search history.

(56) References Cited

U.S. PATENT DOCUMENTS 4,933,083 A * 6/1990 Jones, Jr. .............. 210/490
5,278,106 A * 1/1994 Nakashima et al. ............ 501/12
5,376,347 A   12/1994 Ipponmatsu et al.
6,576,023 B2   6/2003 Nakajima et al.
7,022,300 B2 * 4/2006 Matsubara et al. .......... 423/338

(Continued)

FOREIGN PATENT DOCUMENTS

| BE | 782 431 | 8/1972 |
| EP | 1 197 262 A2 | 4/2002 |
| EP | 1 362 634 A1 | 11/2003 |
| EP | 1 382 384 A1 | 1/2004 |
| JP | 2-95433 | 4/1990 |
| WO | WO 02/068104 A1 | 9/2002 |

OTHER PUBLICATIONS

Joscelyne, Simon M. et al. "Membrane Emulsification—A Literature Review", 2000, Journal of Membrane Science, 169 (2000), pp. 107-117.*

(Continued)

*Primary Examiner*—Jerry Lorengo
*Assistant Examiner*—Jennifer A Smith
(74) *Attorney, Agent, or Firm*—Oblon, Spivak, McClelland, Maier & Neustadt, P.C.

(57) ABSTRACT

A process for producing inorganic spheres, which comprises injecting an aqueous liquid containing an inorganic compound into a laminar flow of an organic liquid which runs at a flow rate of from 0.001 to 2 m/s in a flow path compartmentalized by a partition wall through a plurality of inlet holes formed in one partition wall to form a W/O type emulsion containing the organic liquid as a dispersion medium and the aqueous liquid containing the inorganic compound as a dispersed phase, and solidifying the aqueous liquid containing an inorganic compound in the W/O type emulsion, wherein the partition wall having a plurality of inlet holes is made of a metal sheet having a surface subjected to water repellent treatment.

18 Claims, 1 Drawing Sheet

U.S. PATENT DOCUMENTS

Figure 1:
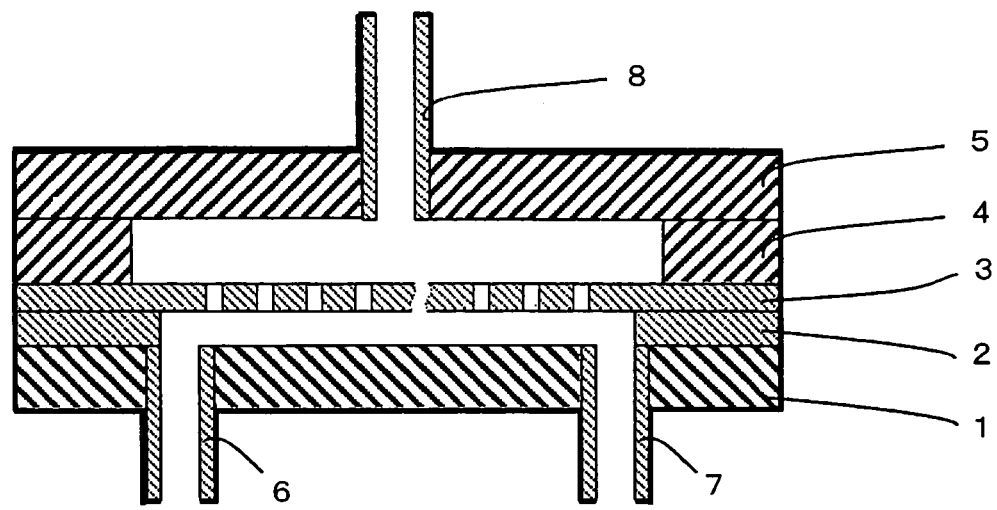

2003/0027020 A1* 2/2003 Berg et al. .................. 428/702
2004/0251569 A1* 12/2004 Matsubara et al. ............. 264/5
2004/0256750 A1* 12/2004 Yamada et al. ................ 264/14
2006/0067864 A1* 3/2006 Matsubara et al. .......... 423/122

OTHER PUBLICATIONS

Iizuka et al. JP59-112830 Abstract. Abstracts of Japan. Jun. 29, 1984.*

U.S. Appl. No. 10/864,593, filed Jun. 10, 2004, Matsubara et al.
U.S. Appl. No. 10/866,694, filed Jun. 15, 2004, Yamada et al.
Helmar Schubert, "Mechanical Emulsification-New Developments and Trends", AICHE National Meeting, XP-001160577, Nov. 12, 2000, 30 pages.
U.S. Appl. No. 11/271,905, filed Nov. 14, 2005, Matsubara et al.
U.S. Appl. No. 12/146,563, filed Jun. 26, 2008, Matsubara et al.

* cited by examiner

PROCESS AND APPARATUS FOR PRODUCING INORGANIC SPHERES

The present invention relates to a process for producing inorganic spheres. Particularly, it relates to a process and an apparatus for continuously producing inorganic spheres having a substantially uniform particle size useful for chromatography supports, cosmetic applications, catalyst supports, etc.

Heretofore, various methods have been proposed to obtain inorganic spheres having a uniform particle size. U.S. Pat. No. 5,376,347 discloses a method of producing inorganic spheres which comprises injecting an aqueous solution of an inorganic compound into an organic liquid through a polymer membrane perforated with inlet holes in a thickness direction and converting the droplets of the aqueous solution containing an inorganic compound in the resulting W/O type emulsion into inorganic spheres. The particle size distribution of the emulsion can be narrowed by this method, but this method is insufficient in view of uniformity in the particle size of the inorganic spheres, since the particle size is influenced by the physical properties of the polymer membrane, and the flow of the organic liquid which is not controlled. Further, the long-term durability of the polymer membrane is problematic.

In recent years, U.S. Pat. No. 6,576,023 has proposed a method and apparatus for producing a homogenous emulsion by injecting a pressurized inorganic compound aqueous solution through distorted inlet holes into an organic liquid. In recent years, development of a method and an apparatus which allow long-term efficient and stable mass production of inorganic spheres having a uniform particle size has been desired.

The object of the present invention is to provide a process and an apparatus capable of producing inorganic spheres having a substantially uniform particle size by a stable continuous process over a long period with high productivity.

The present invention provides a process for producing inorganic spheres, which comprises injecting an aqueous liquid containing an inorganic compound into a laminar flow of an organic liquid which runs at a flow rate of from 0.001 to 2 m/s in a flow path compartmentalized by a partition wall through a plurality of inlet holes formed in one partition wall to form a W/O type emulsion containing the organic liquid as a dispersion medium and the aqueous liquid containing the inorganic compound as a dispersed phase, and solidifying the aqueous liquid containing an inorganic compound in the W/O type emulsion, wherein the partition wall having a plurality of inlet holes is made of a metal sheet having a surface subjected to water repellent treatment.

The present invention also provides an apparatus for producing inorganic spheres, which is constituted in such a manner that an aqueous liquid containing an inorganic compound is injected into a laminar flow of an organic liquid which runs at a flow rate of from 0.001 to 2 m/s in a flow path compartmentalized by a partition wall through a plurality of inlet holes formed in one partition wall to form a W/O type emulsion containing the organic liquid as a dispersion medium and the aqueous liquid containing the inorganic compound as a dispersed phase, and the aqueous liquid containing an inorganic compound in the W/O type emulsion is solidified to form inorganic spheres, wherein the partition wall having a plurality of inlet holes is made of a metal sheet having a surface subjected to water repellent treatment.

FIG. 1 is a cross-sectional view of the emulsification apparatus used in Example 1.

In the present invention, an aqueous liquid containing an inorganic compound is injected through inlet holes into a laminar flow of an organic liquid to form an emulsion containing the organic liquid as a dispersion medium (continuous phase) and droplets of the aqueous solution containing an inorganic compound as a dispersed phase in the continuous phase, i.e. a so-called W/O type emulsion, and then the droplets of the aqueous liquid containing an inorganic compound in the W/O type emulsion are solidified to form inorganic spheres.

As the aqueous liquid containing an inorganic compound, any liquid may be used so long as it forms a precipitate upon solidification. Not only an aqueous solution of an inorganic compound but also a colloidal solution such as a silica sol or an alumina sol may be employed. As the aqueous solution of an inorganic compound, specifically, an aqueous solution of the silicate or the aluminate of an alkali metal, a halide of an alkaline earth metal, a sulfate, a hydrochloride or a nitrate of copper, or a sulfate, a hydrochloride or a nitrate of iron, cobalt or nickel may be mentioned.

In the present invention, it is preferred to use an aqueous liquid containing at least one member selected from the group consisting of potassium silicate, sodium silicate, sodium aluminate and silica as the inorganic compound. Specifically, an aqueous solution containing a water-soluble silica and an aqueous dispersion containing a solid silica (colloidal silica) such as a silica sol obtained by hydrolysis of an organic silicon compound or a commercially available silica sol, may be mentioned. Among them, sodium silicate is most preferred from availability and economical reasons. The proportion of sodium to silicate is preferably from 2.0 to 3.8, particularly preferably from 2.0 to 3.5 in terms of $Na_2O/SiO_2$ molar ratio. The concentration of the alkali silicate or silica in the aqueous liquid is preferably from 5 to 30 mass %, particularly preferably from 5 to 25 mass % in terms of $SiO_2$.

As the organic liquid, a $C_{9-12}$ saturated hydrocarbon is preferred, and selection of the organic liquid includes total consideration of ease of handling, fire safety, ease of separation between the solidified particles and the organic liquid, geometrical properties of the inorganic spherical particles, solubility of the organic liquid in water, etc. The $C_{9-12}$ saturated hydrocarbon may be used alone or as a mixture of at least two. The $C_{9-12}$ saturated hydrocarbon may be a linear hydrocarbon or a hydrocarbon having side chains so long as its chemical stability is good.

As the $C_{9-12}$ saturated hydrocarbon, preferred is one having a flash point of from 20 to 80° C. If a saturated hydrocarbon having a flash point below 20° C. is employed as the organic liquid, the excessively low flash point necessitates countermeasures for fire prevention and work environment. On the other hand, a low volatility hydrocarbon having a flash point exceeding 80° C. is hardly volatile and may adhere to the resulting inorganic spheres in a large amount.

In the present invention, after solidification of the emulsion, the inorganic spheres and the organic liquid are usually subjected to solid-liquid separation. The organic liquid adhering to or adsorbed in the inorganic spheres after separation is preferably vaporized and separated by e.g. a drying operation. The organic liquid preferably has a boiling point of at most 200° C. from a viewpoint of ease of separation by vaporization, and as the organic liquid which satisfies such requirements, preferred is at least one member selected from the group consisting of $C_9H_{20}$, $C_{10}H_{22}$ and $C_{11}H_{24}$.

In the present invention, it is preferred to employ a surfactant for formation of the W/O type emulsion. As the surfactant, although an anionic surfactant or a cationic surfactant may be employed, a nonionic surfactant is preferred in view of easy adjustment of hydrophilicity and lipophilicity. For example, a polyethylene glycol fatty acid ester, a polyethylene glycol alkyl ether, a sorbitan fatty acid ester, a polyoxyethylene sorbitan fatty acid ester, a polyoxyethylene alkyl phenyl ether and a polyoxyethylene alkyl ether are preferred.

The amount of the surfactant varies depending upon conditions such as the type of the surfactant, HLB (hydrophile-lipophile balance) as an index of the degree of hydrophilicity or hydrophobicity of the surfactant and the aimed particle size of the inorganic spheres. However, it is preferably contained in an amount of from 500 to 50,000 ppm, preferably from 1,000 to 20,000 ppm, in the organic liquid. If it is less than 500 ppm, the aqueous solution tends to form large droplets upon emulsification, and therefore the emulsion may be unstable. Further, if it exceeds 50,000 ppm, the amount of the surfactant adhering to the inorganic spherical particles as the product tends to be unfavorably large.

In the present invention, by adjusting the flow rate of the organic liquid to from 0.001 to 2 m/s, emulsion droplets having a narrow particle size distribution are formed, and therefore, the particle size distribution of the obtained inorganic spheres can be narrowed. The flow rate of the organic liquid is particularly preferably from 0.01 to 1 m/s.

The Reynolds number of the organic liquid which flows in the flow path is at most 2,100. When the flow path has a circular cross section, the Reynolds number is calculated from the formula 1, and as the inner diameter D of the flow path, the minimum diameter of the cross section of the flow path is employed. D is the inner diameter (m) of the flow path, u is the average flow rate (m/s), $\rho$ is the fluid density (kg/m$^3$), and $\mu$ is the fluid viscosity (Pa·s).

$$\text{Reynolds number }(-) = D \cdot u \cdot \rho / \mu \qquad \text{Formula 1}$$

When the cross section of the flow path is not circular, the Reynolds number is calculated from the formula 2. r is the hydraulic radius (m) of the flow path={cross-sectional area (m$^2$) of the flow path}/{perimeter (m) of the cross section of the flow path which is in contact with the liquid}, and u, $\rho$ and $\mu$ are as defined for the formula 1.

$$\text{Reynolds number }(-) = 4 \times r \cdot u \cdot \rho / \mu \qquad \text{Formula 2}$$

If the Reynolds number is at most 2,100, the flow of the organic liquid is laminar and therefore stable. As a result, the aqueous liquid containing an inorganic compound supplied through the inlet holes constantly forms a W/O type emulsion having a fixed particle size, and therefore, inorganic spheres having a substantially uniform particle size are likely to be produced. On the other hand, if the Reynolds number exceeds 2,100, the flow of the organic liquid is turbulent. Therefore, a W/O type emulsion having irregular particle sizes, like those obtained conventionally, tends to be obtained, and the resulting inorganic spheres also have irregular particle sizes. In order to stabilize the flow of the organic liquid, the Reynolds number of the flow of the organic liquid is preferably at most 500. The shape of the flow path for the organic liquid is not particularly limited.

Now, the mode for carrying out the present invention will be explained with reference to the drawing. In the drawing, numerical references 1 and 5 designate acrylic resin plates, numerical reference 2 designates a fluororesin sheet, numerical reference 3 designates a metal partition wall, and numerical reference 4 designates an acrylic resin plate component. In FIG. 1, an aqueous liquid containing an inorganic compound is introduced from a nozzle 8 and injected through inlet holes 9 into a laminar flow of an organic liquid which is introduced from a nozzle 6 and discharged from a nozzle 7. The aqueous liquid injected through the inlet holes 9 grows into droplets larger than the holes at the exits of the inlet holes 9 due to the interfacial tension. Then, the flow of the organic liquid splits off the droplets to form a W/O type emulsion containing the droplets in the organic liquid.

In the present invention, a material resistant to the aqueous liquid containing an inorganic compound and the organic liquid is used as the material constituting the partition wall. A partition wall mainly composed of a metal is preferable in view of the excellent processability and mechanical strength, and for the partition walls other than the metal partition wall 3, a material mainly made of a resin may be used preferably. As the resin, it is preferred to employ at least one member selected from polyphenylene sulfide, polyether ether ketone, polyimide, polyamideimide, aromatic polyester and fluororesin in view of the excellent processability and dimension stability.

In the present invention, the metal partition wall 3 having a plurality of inlet holes 9 through which the aqueous liquid runs is prepared by forming a plurality of inlet holes through a metal sheet and then subjecting the metal sheet to water repellent treatment. The water repellent treatment facilitates detachment of the aqueous liquid containing an inorganic compound from the partition wall as it goes out of the inlet holes 9. Observation with a high speed camera has revealed that when the metal partition wall 3 is hydrophilic, the aqueous liquid flows along the partition wall after it passes through the inlet holes 9, and therefore, tends to form uneven droplets in the emulsion. The water repellent treatment has to be given to at least part of the metal sheet surface which is in contact with the organic liquid.

The metal sheet is made of a metallic material which has excellent resistance to the aqueous liquid containing an inorganic compound and the organic liquid, shows processability at the time of formation of the inlet holes and has abrasion resistance and deflection resistance and practical excellent performance. As the metallic material, nickel, a nickel alloy and stainless steel are preferred. Among them, a stainless steel sheet is preferably used in view of its relatively inexpensive price and availability and excellent durability and processability.

The thickness of the metal sheet is preferably from 10 to 500 µm. A sheet thinner than 10 µm is unfavorable because such a sheet folds so easily that it may not stay flat, and droplets of the aqueous liquid injected from the respective inlet holes can combine together to hinder formation of uniform droplets. On the other hand, a sheet thicker than 500 µm is also unfavorable because it takes too complicated steps or too much time to process it and therefore, it tends to lead to high costs or poor processing accuracy. The thickness of the sheet is particularly preferably from 30 to 200 µm.

The inlet holes may be formed by various processing methods, for example, by laser machining, etch machining, electroforming or press working without any particular restrictions, and laser machining with an excimer laser or an UV-YAG laser is preferable in view of processing accuracy.

The water repellent treatment is carried out so as to impart long-lasting water repellency to the metal surface without clogging the inlet holes. Specifically speaking, it is preferred to coat the surface with a water repellent obtained by dissolving a hydrophobic resin or a silane coupling agent in a solvent. As the hydrophobic resin, a thermoplastic resin is preferably used, because even if the inlet holes are clogged by the coating, the inlet holes can be opened by heating. A solvent-soluble fluororesin is preferably used as the hydrophobic resin in view of durability. Though any coating techniques can be used, dip coating is preferable to give a uniformly thin even coating of a water repellent. The water repellent treatment is carried out so as to form a water repellent coating with a thickness of from 0.001 to 5 µm. A coating thinner than 0.001 µm is unfavorable because it is poor in durability and mechanical strength and vulnerable to pinholes. Meanwhile, a coating thicker than 5 µm is unfavorable because the inlet holes are likely to be clogged upon coating.

The cross sections of the inlet holes are preferably circular, though they may be of a different shape. Inlet holes having cross sections of at least one shape selected from the group consisting of circular, rectangular, elliptic and triangular shapes are preferable because processing is relatively easy, and inorganic spheres having a uniform particle size can stably be produced. Each inlet hole must be smaller than the width of the flow path for the organic liquid. As the method for forming the inlet holes, a processing method employing a laser such as an excimer laser or pressing may be mentioned, but the method is not particularly limited.

It is estimated that when the cross sections of the inlet holes are not circular, the aqueous liquid forms droplets having curvature distribution at the exits of the holes, and they spontaneously split off into the organic liquid at a relatively early stage. Accordingly, noncircular inlet holes have an advantage over circular inlet holes in that emulsion droplets having relatively small particle sizes are obtained. Further, in such a case, it is preferred that the ratio of the circumscribed circle diameter of the cross section to the inscribed circle diameter of the cross section is preferably at most 20, in particular, at most 10. If it exceeds 20, the droplets tend to divide in length, and as a result, the emulsion droplets unfavorably tend to be non-uniform. It is particularly preferred that the inscribed circle diameter of the cross section is at least 1 µm, and the circumscribed circle diameter of the cross section is at most 80 µm.

The quadruple of the hydraulic radius r of the cross section of each inlet hole is preferably from 0.1 to 100 µm, in particular from 1 to 80 µm. The hydraulic radius r (m) of the cross section is defined previously for the formula 2 as the hydraulic radius (m)={cross-sectional area (m$^2$) of the inlet hole}/{perimeter (m) of the cross section of the inlet hole which is in contact with the fluid}. For an inlet hole having a circular cross section, the hydraulic radius r=(inner diameter D of the circle)/4, and thus the quadruple of the hydraulic radius r equals the inner diameter D of the circle. It is not unfavorable that the quadruple of the hydraulic radius r of the cross section of the inlet hole is less than 0.1 µm in view of productivity, because the amount of the aqueous liquid containing an inorganic compound supplied tends to be small. Further, it is also unfavorable that it is larger than 100 µm, because emulsion droplets outside the aimed particle size range are likely to form.

In the present invention, inlet holes through which the aqueous liquid containing an inorganic compound is supplied are perforated in a plural number in the direction of the thickness of the metal partition wall 3 in view of productivity. Formation of at least 100, particularly at least 1000 inlet holes makes it easy to attain sufficient productivity.

The alignment of the inlet holes is not particularly limited, and in view of productivity and processability, a plurality of inlet holes are preferably aligned into a grid pattern by laying out a plurality of inlet holes on the metal partition wall 3 transversely (across the organic liquid flow path) and longitudinally (along the organic liquid flow path) at constant pitches or into a staggered pattern by making an inlet hole at the center of the diagonals of the rectangle connecting the centers of transversely neighboring two inlet holes and longitudinally neighboring two inlet holes on the grid pattern. Particularly, a staggered pattern is particularly preferred in view of improvement of productivity because the inlet holes can be aligned closely with high porosity.

The porosity of the metal partition wall 3 is preferably from 1 to 35%. A porosity lower than 1% unfavorably leads to low productivity and high equipment expenses. On the other hand, it is preferred that the porosity is lower than 35% because of the high possibility that droplets of the aqueous liquid injected through the inlet holes combine together to form emulsion droplets having uneven particle sizes. The porosity is particularly preferably from 2 to 25%.

When a plurality of inlet holes having the same area are aligned into a certain pattern, the porosity is calculated from the formula 3, where S is the cross-sectional area of each inlet hole (m$^2$), $P_1$ is the pitch (m) in the transverse direction, and $P_2$ is the pitch (m) in the longitudinal direction.

$$\text{Porosity (\%)} = 100 \times S/(P_1 \times P_2) \quad \text{Formula 3}$$

When circular inlet holes are aligned into a grid pattern, the porosity is can be calculated from the formula 4 derived from the formula 3. D is the diameter (m) of the inlet holes, and $P_1$ and $P_2$ are the same as defined for the formula 3.

$$\text{Porosity (\%)} = 78.5 \times D^2/(P_1 \times P_2) \quad \text{Formula 4}$$

When circular inlet holes are aligned into a staggered pattern (90° staggered pattern) wherein the above-mentioned two diagonals make a right angle and into a staggered pattern (60° staggered pattern) in which above-mentioned two diagonals make 60°, the porosity can be calculated from the formula 5 and from the formula 6, respectively, derived from the formula 3. D is the same as defined for the formula 4, and P is the pitch (m). In the formula 6, P is the shorter one (m) of the transversal and longitudinal pitches.

$$\text{Porosity (\%)} = 157 \times D^2/P^2 \quad \text{Formula 5}$$

$$\text{Porosity (\%)} = 91 \times D^2/P^2 \quad \text{Formula 6}$$

The inlet holes are preferably formed in the metal partition wall 3 at pitches larger than half the circumscribed circle diameter of the cross section of the inlet holes, particularly preferably larger than the circumscribed circle diameter of the cross section of the inlet holes. It is unfavorable that the inlet holes are formed at pitches smaller than the circumscribed circle diameter, because the emulsion droplets are likely to unite, and as a result, the particle sizes becomes uneven. However, in order to improve productivity, it is preferred that they are formed as close to one another as possible so long as the droplets do not unite.

To effectively obtain inorganic spheres having the aimed particle sizes, it is preferred that the ratio of the average particle size of the inorganic spheres to the quadruple of the hydraulic radius r of the cross section of the inlet holes is from 0.1 to 5.0, in particular from 0.3 to 3.0. It is unfavorable that the ratio is less than 0.1, because the productivity decreases, and the average particle size of the resulting inorganic spheres tends to be larger than the aimed particle size. On the other hand, it is unfavorable that it exceeds 5.0, because particle size control is difficult, and fine particles having sizes significantly outside the aimed particle size are likely to be formed as by-products.

The apparatus for producing inorganic spheres of the present invention may be installed so that the metal partition wall 3 is in parallel with a horizontal plane, as shown in FIG. 1. However, when the density of the organic liquid is smaller than the density of the aqueous liquid, it is preferred to install the apparatus with an angle of at least 30°, in particular with a right angle, between the organic liquid flow path and the horizontal plane and flow the organic liquid upwards from below, because inorganic spheres having a uniform particle size are likely to be obtained. On the other hand, when the density of the organic liquid is larger than the density of the aqueous liquid, the apparatus is preferably used so that the organic liquid flows downwards from above, because it is easy to obtain the above-mentioned effect of uniforming the particle sizes.

When the apparatus is installed so that the metal partition wall 3 is set at an angle of at least 30° to a horizontal plane, a horizontal plane at a certain height suffers pressure from the aqueous liquid side and the organic liquid side due to the liquid depth. On the assumption that the depths of the aqueous liquid and the organic liquid are substantially the same at a certain horizontal plane, a pressure difference corresponding to {(the density of the aqueous liquid)−(the density of the organic liquid)}×(liquid depth) arises due to the density difference between the aqueous liquid and the organic liquid. Accordingly, the change in the pressure difference between the aqueous liquid side and the organic liquid side over the entire flow path can be made to be relatively narrow, by flowing the organic liquid upwards when the density of the organic liquid is larger than that of the aqueous liquid, or by flowing it downwards in the opposite case, as compared with when the flow path of the organic liquid is in parallel with a horizontal plane. As a result, the amount of the aqueous liquid supplied from the inlet holes can be stabilized, the emulsion droplet size can be uniformalized, and the effect of uniformalizing the particle size of the obtained inorganic spheres is obtained.

In the present invention, the particle sizes of the droplets in the resulting W/O type emulsion are affected not only by the above-mentioned conditions for formation of the inlet holes but also by the ratio of the linear velocity of the organic liquid to the linear velocity of the aqueous liquid in the flow direction. In FIG. 1, the linear velocity of the aqueous liquid in the flow direction is measured in the inlet holes 9. The ratio of the linear velocities is preferably from 1 to 500, particularly preferably from 10 to 300. It is not economically preferable that the ratio exceeds 500, because too much of the organic liquid is likely to be consumed. It is unfavorable that the ratio is less than 1, because the flow of the organic liquid can not detach the droplets effectively, and uneven emulsion droplets are likely to be formed.

Solidification of the aqueous liquid containing an inorganic compound in the W/O type emulsion into inorganic spheres may be achieved by precipitation of the inorganic compound by a precipitant. The precipitant may be an aqueous solution of at least one member selected from the group consisting of a halide or a carbonate of an alkali metal, an inorganic acid, an organic acid, the ammonium salt of an inorganic acid, the ammonium salt of an organic acid and a halide of an alkaline earth metal. Specifically, an aqueous solution of e.g., ammonium hydrogen carbonate, ammonium sulfate, potassium chloride or potassium hydrogen carbonate may be mentioned, but it is not limited thereto.

When the inorganic compound in the aqueous liquid containing an inorganic compound is silica, gelation of the W/O type emulsion allows the dispersed spherical droplets of the aqueous solution to gel while maintaining their shapes and gives a spherical silica hydrogel. For gelation, it is preferred to introduce a gelling agent to the emulsion. As the gelling agent, an acid such as an inorganic acid or an organic acid is employed, and particularly an inorganic acid, e.g., sulfuric acid, hydrochloric acid, nitric acid or carbon dioxide is preferred. Use of carbon dioxide is the simplest and the most suitable from the viewpoint of easy operations. As the carbon dioxide gas, pure carbon dioxide gas having a 100% concentration may be introduced, or carbon dioxide gas diluted with air or an inert gas may be introduced. The gelation time is usually preferably from 4 to 30 minutes, and the gelation temperature is preferably from 5 to 30° C.

After completion of the gelation, it is preferred to leave the reaction system to stand so that the emulsion separates into two phases, the organic liquid phase and the aqueous phase containing a silica hydrogel, and then separate the silica gel. When a saturated hydrocarbon is used as the organic liquid, the phase of the organic liquid separates out as the upper layer, while the phase of the aqueous liquid containing the silica hydrogel separates out as the lower layer, and the they are separated by a known means, preferably by means of a separator.

If necessary, an acid such as sulfuric acid is added to the aqueous slurry of the silica hydrogel to a pH of about from 1 to 5 to complete the gelation, and then the aqueous slurry is subjected to steam distillation at a temperature of from 60 to 150° C., preferably from 80 to 120° C. to evaporate a slight amount of the saturated hydrocarbon remaining in the aqueous slurry and heated at an appropriate pH about from 7 to 9 to age the silica hydrogel.

After the aging, the aqueous slurry is filtered arbitrarily to recover the silica hydrogel, and the silica hydrogel is dried at a temperature of about from 100 to 150° C. for from 1 to 30 hours to give porous silica spheres.

When an alkali silicate aqueous solution is used as the aqueous liquid containing silica with an acid as the gelling agent, it is preferred to adequately wash the silica hydrogel (wet cake) after filtration with water in order to prevent an alkali metal salt (e.g., sodium carbonate when the gelling agent is carbon dioxide) formed as a by-product from contaminating the porous silica spheres. If necessary, water may be added to the washed wet cake to make a slurry again, and filtration and washing with water are repeated again. In this case, pH adjustment of the slurry to about from 1 to 5 and aging of the silica hydrogel may be carried out again, if necessary.

EXAMPLE 1

(1) Preparation of Solution

A sodium silicate aqueous solution having a $SiO_2$ concentration of 24.4 mass % and a $Na_2O$ concentration of 8.14 mass % ($SiO_2/Na_2O$ molar ratio=3.09, density: 1,320 kg/m$^3$) was prepared. As the organic liquid, isononane ($C_9H_{20}$, density: 730 kg/m$^3$) was employed, and sorbitan monooleate as a surfactant was preliminarily dissolved in an amount of 5,000 ppm in isononane.

(2) Assembly of Emulsification Apparatus

A cross-sectional view of the emulsification apparatus is shown in FIG. 1. Through a 50 mm-square acrylic resin plate 1 having a thickness of 2 mm, two inlet holes having an inner diameter of 3.2 mm were formed, and rubber tube pipings (manufactured by SAINT-GOBAIN K.K., trade name: TYGON R-3603) having an outer diameter of 3.2 mm was connected to each inlet hole to make nozzles 6 and 7 so that a liquid could be supplied through the nozzle 6, and the liquid could be discharged through the nozzle 7. At the center of another 50 mm-square acrylic resin plate having a thickness of 2 mm, an inlet hole having an inner diameter of 3.0 mm was formed, and a tetrafluoroethylene tube piping having an inner diameter of 1 mm was connected through a joint to make a nozzle 8 so that a liquid could be supplied through the nozzle 8. A 30 mm square was cut out of the inside of another 50 mm-square acrylic resin plate having a thickness of 2 mm, leaving 10 mm-margins on the periphery to make an acrylic resin plate component 4. Then, in a 50 mm-square fluororesin sheet 2 having a thickness of 400 μm, a slit having a width of 3 mm and a length of 35 mm was cut. Further, through the inner part of a 50 mm-square SUS304 sheet having a thickness of 50 μm, a total of 6440 inlet holes having an inner diameter of 30 μm and circular cross sections were formed with an UV-YAG laser into a grid pattern in which 28 inlet holes were aligned at 100 μm pitches in the transversal direction, and 230 inlet holes were aligned at 100 μm pitches in the longitudinal direction, and the SUS304 sheet was coated by dip coating with a solution of a solvent-soluble fluororesin (manufactured by Asahi Glass Company, Limited, trade name: CYTOP) in a solvent (manufactured by Asahi Glass Company, Limited, trade name:CT-Soly100) at a coating thickness of 0.1 μm to make a metal partition wall 3. The porosity inside of the line connecting the centers of the transversely and longitudinally outermost inlet holes was calculated at 7.1% from the formula 4.

The acrylic resin plate 1, the fluororesin sheet 2, the metal partition wall 3, the acrylic resin plate component 4 and the acrylic resin plate 5 were laminated in this order, and the four sides were clamped with equally forces. The longitudinal and transverse directions of the pattern of the inlet holes formed in the metal partition wall 3 were in parallel with the longitudinal and transverse directions of the slit cut in the fluororesin sheet 2, respectively, and the inlet holes were located in the center of the slit. The nozzle 6 and the nozzle 7 on the acrylic resin plate 1 were positioned over the slit in the fluororesin sheet 2. Further, the assembled apparatus was checked for leaks by preliminarily supplying water.

(3) Emulsification

The emulsification apparatus assembled in (2) was placed horizontally, and the surfactant-containing isononane prepared in (1) and the sodium silicate aqueous solution prepared in (1) were supplied through the nozzle 6 and the nozzle 8, respectively, to continuously produce a W/O type emulsion having the sodium silicate aqueous solution dispersed in the surfactant-containing isononane. The surfactant-containing isononane was supplied at a rate of 1350 mL/h. The experiment was carried out at room temperature for 2 hours.

The Reynolds number of the flow of the isononane was about 213 as calculated from a hydraulic radius of the flow path of 176.5 μm, a linear velocity of 0.31 m/s and a viscosity of $7.5 \times 10^{-4}$ Pa·s, and the flow of isononane was in a laminar state. The supply of the sodium silicate aqueous solution was 32.2 mL/h, and the linear velocity in the inlet holes was $2.0 \times 10^{-3}$ m/s.

The ratio of the linear velocity of the flow of the sodium silicate aqueous solution in the inlet holes to the linear velocity of the flow of the isononane was 159. Continuous emulsification monitoring using a high speed camera set in front of the acrylic resin plate 1, which is omitted in the figure, revealed that the sodium silicate aqueous solution formed droplets as it went out of the inlet holes, and the emulsion droplets had a substantially uniform particle size of about 60 μm.

(4) Gelation

The W/O type emulsion prepared in (3) was collected and gelled by blowing in 100% carbon dioxide gas at a supply rate of 300 mL/min for 15 minutes. After addition of 200 mL of water, the resulting silica hydrogel was left to stand still for 10 minutes and allowed to separate into two phases based on the difference in specific gravity, and the aqueous silica hydrogel slurry (aqueous phase) was recovered. The aqueous silica hydrogel slurry was adjusted to pH 2 at 25° C. with 0.1 N aqueous sulfuric acid, allowed to stand still for 30 minutes and then filtered. The filter cake was washed with water and dried at 120° C. for 20 hours to give porous silica spheres. The yield of the porous silica spheres was 19.7 g.

(5) Geometrical Analysis

It was confirmed by scanning electron microphotography that the porous silica spheres were almost completely spherical. The particle size distribution was calculated by actually measuring the particle sizes of a total of more than 1000 spheres in several photographs. The arithmetical mean particle size was 50 μm with a standard deviation of 6.4 μm. The value obtained by dividing the standard deviation in the particle size distribution by the arithmetical mean particle size was 0.128.

EXAMPLE 2 (COMPARATIVE EXAMPLE)

A W/O type emulsion was continuously produced in the same manner as in Example 1 except that the metal partition wall 3 was replaced by a perforated metal sheet without a fluororesin coating. Emulsification monitoring with a high speed camera revealed formation of droplets having particle sizes larger than 200 μm in the emulsion and the presence of fine droplets as the by-product resulting from division of these emulsion droplets.

EXAMPLE 3

A W/O type emulsion was continuously produced in the same manner as in Example 1 except that the emulsification time was changed to 954 hours, and the W/O type emulsion produced during the last 2 hours of the operation was recovered and gelled in the same manner as in Example 1 to give porous silica spheres. The yield of the porous silica spheres was 19.5 g.

It was confirmed by scanning electron microphotography that the porous silica spheres were almost completely spherical. The arithmetical mean particle size measured in the same manner as in Example 1 was 51 μm with a standard deviation of 6.8 μm. The value obtained by dividing the standard deviation in the particle size distribution by the arithmetical mean particle size was 0.133, which indicates that the porous silica spheres had a substantially uniform particle size.

EXAMPLE 4 (COMPARATIVE EXAMPLE)

A W/O type emulsion was continuously produced in the same manner as in Example 1 except that the metal partition wall 3 was replaced by a 50 mm-square polyphenylene sulfide sheet having a thickness of 50 μm with inlet holes formed in the center in the same manner as in Example 1, and the emulsification time was changed to 55 hours, and the W/O type emulsion produced during the last 2 hours of the operation was recovered and gelled in the same manner as in Example 1 to give porous silica spheres. The yield of the porous silica spheres was 19.4 g.

It was confirmed by scanning electron microphotography that the porous silica spheres were almost completely spherical. The particle size distribution was analyzed in the same manner as in Example 1, and the arithmetical mean particle size was 46 μm with a standard deviation of 18.3 μm. The value obtained by dividing the standard deviation in the particle size distribution by the arithmetical mean particle size was 0.396, which indicates that the porous silica spheres had a substantially nonuniform particle size, i.e. they showed broader particle size distribution than those in Examples 1 and 3. The reason is not clear but presumably because the surface of the polyphenylene sulfide sheet became hydrophilic with the lapse of time.

The metal partition wall used in the present invention is easy to process and highly resistant to acidic and basic aqueous liquids and organic liquids and has excellent mechanical properties. Therefore, it is unlikely to suffer from troubles such as deflection and abrasion and is suitably used for large-scale production equipment.

The present invention makes it possible to produce inorganic spheres having a substantially uniform particle size for a long time by a stable continuous process with high productivity. Especially, it is possible to produce inorganic spheres having an arithmetic mean particle size of from 0.1 to 100 μm as measured by scanning electron photography and a value of 0.20 obtained by dividing the standard deviation in particle size distribution by the arithmetic mean particle size.

The entire disclosure of Japanese Patent Application No. 2003-166601 filed on Jun. 11, 2003 including specification, claims, drawings and summary is incorporated herein by reference in its entirety.

What is claimed is:

1. A process for producing inorganic spheres, which comprises injecting an aqueous liquid containing an inorganic compound comprising sodium silicate or potassium silicate into a laminar flow of an organic liquid which runs at a flow rate of from 0.001 to 2 m/s in a flow path compartmentalized by a partition wall through a plurality of inlet holes formed in one partition wall to form a W/O type emulsion containing the organic liquid as a dispersion medium and the aqueous liquid containing the inorganic compound as a dispersed phase, and solidifying the aqueous liquid containing an inorganic compound in the W/O type emulsion, wherein the partition wall having a plurality of inlet holes is made of a metal sheet having a surface subjected to water repellent treatment which is carried out using a solvent-soluble thermoplastic fluororesin, and wherein said laminar flow of the organic liquid is at a Reynolds number of at most 2,100.

2. The process for producing inorganic spheres according to claim 1, wherein the thickness of the metal sheet is from 10 to 500 μm.

3. The process for producing inorganic spheres according to claim 1, wherein the thickness of the metal sheet is from 30 to 200 μm.

4. The process for producing inorganic spheres according to claim 1, wherein the metal sheet is made from a material selected from the group consisting of nickel, a nickel alloy and stainless steel.

5. The process for producing inorganic spheres according to claim 1, wherein the metal sheet is made from stainless steel.

6. The process for producing inorganic spheres according to claim 1, wherein the water repellent treatment is carried out by spraying or spreading.

7. The process for producing inorganic spheres according to claim 1, wherein the water repellent treatment gives a water repellent coating having a thickness of from 0.001 to 5 μm.

8. The process for producing inorganic spheres according to claim 1, wherein the inlet holes are formed in a number of at least 100.

9. The process for producing inorganic spheres according to claim 1, wherein the inlet holes are formed in a number of at least 1000.

10. The process for producing inorganic spheres according to claim 1, wherein the ratio of the linear velocity of the organic liquid in the flow direction to the linear velocity of the aqueous liquid in the flow direction is from 1 to 500.

11. The process for producing inorganic spheres according to claim 1, wherein the ratio of the linear velocity of the organic liquid in the flow direction to the linear velocity of the aqueous liquid in the flow direction is from 10 to 300.

12. The process for producing inorganic spheres according to claim 1, wherein the W/O type emulsion is solidified by adding an acid.

13. The process for producing inorganic spheres according to claim 1, wherein the organic liquid is a $C_{9\text{-}12}$ saturated hydrocarbon.

14. The process for producing inorganic spheres according to claim 1, wherein the Reynolds number of the organic liquid is at most 500.

15. The process for producing inorganic spheres according to claim 1, wherein the cross sections of the inlet holes have at least one shape selected from the group consisting of circular, rectangular, triangular and elliptic shapes.

16. The process for producing inorganic spheres according to claim 1, wherein the quadruple of the hydraulic radii r of the cross sections of the inlet holes are from 0.1 to 100 μm.

17. The process for producing inorganic spheres according to claim 1, wherein the quadruple of the hydraulic radii r of the cross sections of the inlet holes are from 1 to 80 μm.

18. The process for producing inorganic spheres according to claim 1, wherein the fluororesin is a perfluoropolymer.

* * * * *